United States Patent [19]

Ferro

[11] 4,190,320
[45] Feb. 26, 1980

[54] PROJECTION SCREEN

[76] Inventor: Jesus Ferro, 425 Demody St., Roselle, N.J. 07203

[21] Appl. No.: 954,214

[22] Filed: Oct. 24, 1978

[51] Int. Cl.² ............................................. G03B 21/60
[52] U.S. Cl. .................................... 350/129; 350/125; 428/142; 428/164
[58] Field of Search ...................... 350/117, 125, 129; 428/142, 163, 164

[56] References Cited

U.S. PATENT DOCUMENTS

| | | | |
|---|---|---|---|
| 2,968,219 | 1/1961 | Saiia | 350/117 |
| 2,984,152 | 5/1961 | Mihalakis . | |
| 3,063,339 | 11/1962 | Mihalakis . | |
| 3,408,132 | 10/1968 | Chandler et al. | 350/125 |
| 3,507,548 | 4/1970 | Hoffman et al. . | |
| 3,811,750 | 5/1974 | Coulthard . | |
| 3,844,644 | 10/1974 | Martinez | 350/129 X |
| 3,851,950 | 12/1974 | Andres et al. | 350/125 |
| 3,964,822 | 6/1976 | Yamashita | 350/117 |
| 4,089,587 | 5/1978 | Schudel | 350/129 X |

*Primary Examiner*—Richard A. Wintercorn
*Attorney, Agent, or Firm*—Amster, Rothstein & Engelberg

[57] ABSTRACT

A front projection screen is disclosed which is especially suitable for wide angle viewing. The screen includes two reflecting layers separated by a light transmissive layer, and a light-diffusing surface coating provided on the frontmost reflecting layer. An embossed pattern is formed on the front surface of the screen which enables it to provide a reflected image of almost constant brightness and neglible distortion over a large range of viewing angles.

15 Claims, 4 Drawing Figures

PROJECTION SCREEN

DESCRIPTION OF THE INVENTION

The present invention relates generally to projection screens, and more particularly to a front projection screen especially suited for wide angle viewing.

Many instances arise in which it is desired to present a clear reflected image from a projection screen to a viewer, notwithstanding his or her position relative to the screen. For example, with the growing popularity of home TV screen projection systems, it may not be possible to hang the screen at a location other than one which requires the viewing audience to spread out in many directions relative to the screen. A screen which will enable a viewer located at extreme sides thereof to perceive a reflected image of comparable brightness and clarity to that seen by another directly in front of the screen is, of course, most desirable.

Examples of screens intended for wide angle viewing appear in U.S. Pat. Nos. 3,891,750 and 3,844,644. The screens of these patents employ a single metallic reflecting layer, and a plastic film layer having a hairline surface. These screens are indicated as being viewable in a horizontal plane out to angles of about 45° to 55°. However, they also exhibit a relatively rapid decrease in reflected image brightness when viewed from other than a normal head-on direction and, moreover, tend to narrow the useful viewing angle in a vertical plane, thereby making their use undesirable when viewers are seated at different levels. Another known screen, disclosed in U.S. Pat. No. 3,408,132, uses a layer of reflecting metallic foil which is compression rolled and separated from another foil, in order to obtain surface irregularities which control the brightness of the reflected image over a range of viewing angles. However, while the screen of the 3,408,132 patent is disclosed as reflecting a relatively bright image when viewed head-on, the image brightness falls off rapidly as one moves to either side of the screen.

It is an object of the present invention to overcome the above and other shortcomings in prior art projection screens.

It is another object of the present invention to provide a projection screen especially suitable for wide angle viewing.

It is a further object of the present invention to provide a projection screen which can be repeatedly rolled up for storage after being used in an open flat configuration.

It is still another object of the present invention to provide a projection screen capable of reflecting a projected image with substantially constant brightness over a wide range of viewing angles.

In accordance with the present invention, a projection screen comprises a fabric backing layer, a deformable filler layer having its rear surface bonded to the backing layer, first and second metallic reflecting layers which are separated from each other by a light transmissive film layer, the first reflecting layer being maintained against the front surface of the filler layer, and a light diffusing surface layer coated on the front surface of the second metallic reflecting layer. A crosshatched pattern comprising intersecting sets of grooves is formed in the front viewing surface of the screen.

In a preferred embodiment, the crosshatched pattern includes one set of parallel, equally-spaced grooves of a given depth aligned in the vertical viewing direction, and a second set of parallel, equally-spaced grooves of a lesser given depth aligned in the horizontal viewing direction.

The above brief description, as well as further objects, features and advantages of the present invention will be more fully understood by reference to the following detailed description of the presently preferred, but nonetheless illustrative embodiment, in accordance with the present invention when taken in conjunction with the accompanying drawings, wherein.

Figure 1:
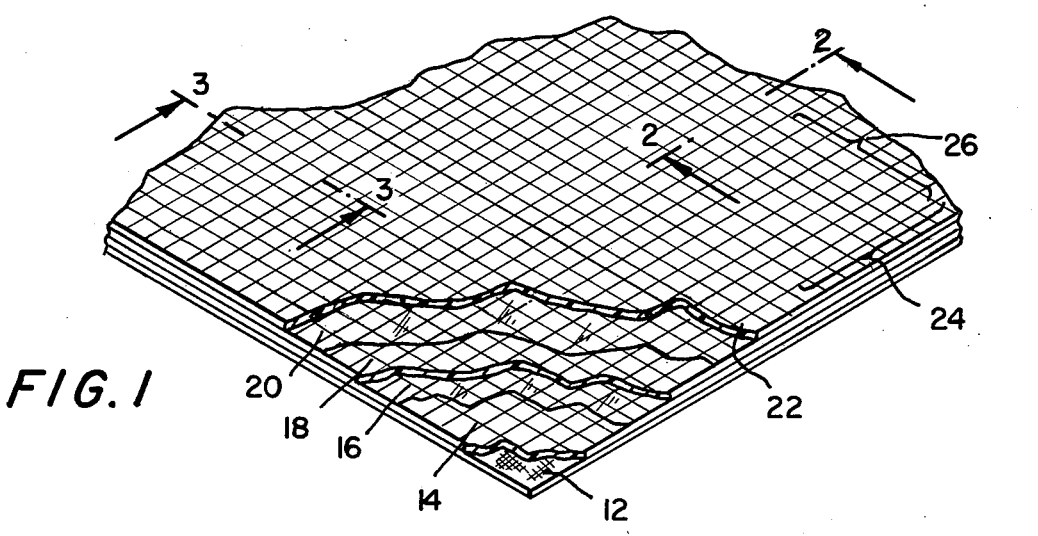
FIG. 1 is a perspective, fragmented view of a projection screen in accordance with the present invention showing individual component layers thereof.
Figure 3:
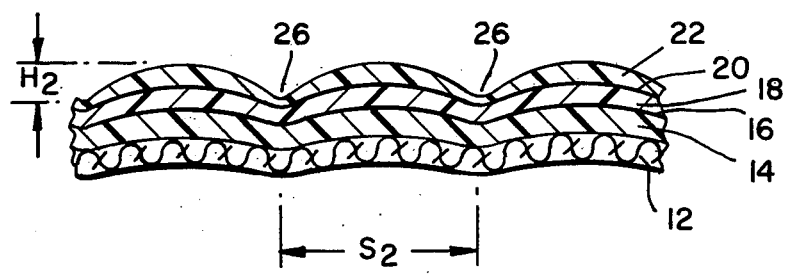
Figure 4:
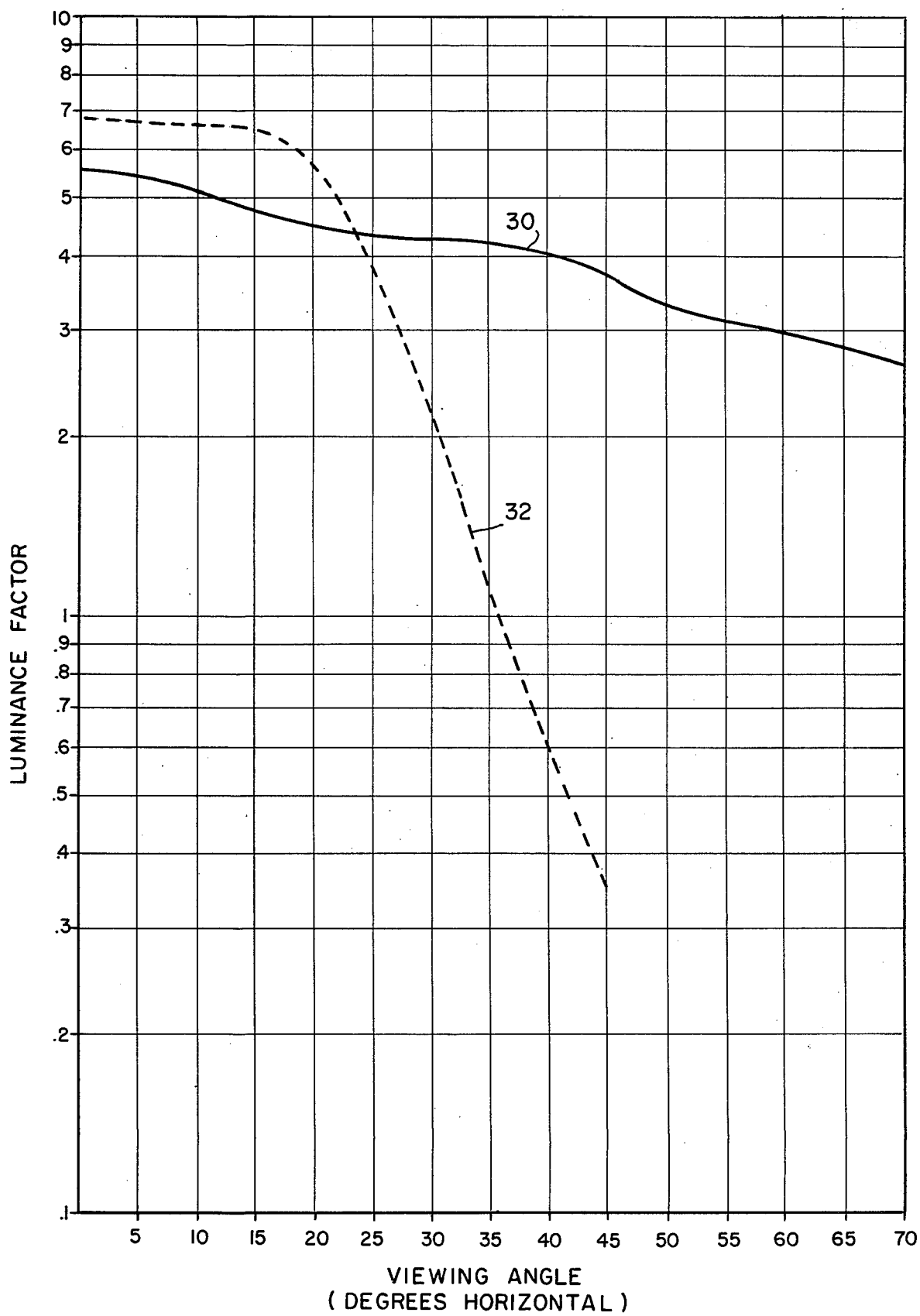

FIG. 3 is an enlarged, cross-sectional view of the screen as viewed along line 3—3 in FIG. 1, showing a second set of parallel grooves formed to a second given depth therein which is less than the first given depth, according to the present invention; and FIG. 4 is a graph showing the relative brightness of an image reflected from two versions of the screen of the present invention over a range of horizontal viewing angles.

Referring now in detail to the drawings and initially to FIG. 1 thereof, in accordance with an illustrative embodiment demonstrating objects and features of the present invention, there is provided a projection screen designated generally by the reference numeral 10. Basically, the screen 10 comprises six individual layers which are laminated together to form a flexible composite material capable of being rolled up for storage, or mounted flat against a frame at a fixed location for viewing. As shown in FIG. 1, the screen 10 has its viewing or front surface facing upwardly.

Screen 10 includes a backing layer 12 of a woven fabric such as cotton, polyester, nylon or combinations thereof, this layer preferably being dyed black.

The screen 10 also includes a filler layer 14 of semi-rigid, polyvinyl chloride film which may be from about 0.002 to 0.020 inches thick. This film should have substantial grain retention, i.e., ability to maintain an embossed pattern without loosing its set. The filler layer 14 is laminated to the fabric 12 with a conventional thermosetting adhesive. This adhesive may consist of a plastisol or a urethane material, for example, in order to provide for fire retardency.

A first reflective metallic layer 16 is secured against the front surface of filler layer 14. Metallic layer 16 may comprise aluminum which is vacuum coated on one surface of a film layer 18 of light transmissive, polyester material, the coating having a surface resistivity in the range of about 0.25 to 1.0 ohms. This aluminized surface of the film layer 18 is then laminated to the filler layer 14 with a conventional, black pigmented thermosetting adhesive, e.g., a vinyl-acrylic. The thickness of film layer 18 may range from about 0.00025 to 0.005 inches.

A second reflective metallic layer 20 is maintained against the remaining surface of the film layer 18, and may also comprise aluminum which is vacuum coated thereon to a surface resistivity in the range of 0.5 ohm to 2.0 ohms.

A light-diffusing surface layer 22 is coated atop the second metallic layer 20, and comprises a thermosetting polymeric material providing a diffusion rate of from about 5% to about 30%. The overall thickness of surface layer 22 may range from 0.001 inch to 0.010 inches, and it is preferred that the surface layer 22 be deposited in successive layers each ranging in thickness of from about 0.00005 to 0.001 inches, the thickness of these layers being governed by the depth of the pattern to be embossed in the front of the screen 10.

Figure 2:
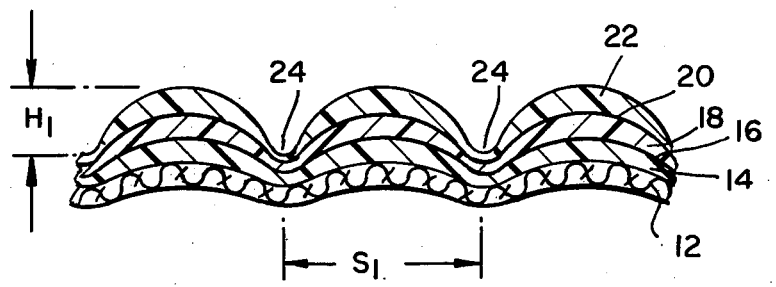
FIG. 2 is an enlarged, cross-sectional view of the screen as viewed along line 2—2 in FIG. 1 showing one set of parallel grooves formed to a first given depth therein according to the present invention.

Referring now to FIGS. 1—3, two orthogonal sets of grooves are shown embossed in the front surface of the screen 10. A first set of equally-spaced, parallel grooves 24 is formed to a depth H1 of about 350 microns (FIG. 2), these grooves to be vertically oriented when the screen 10 is in use. A second set of parallel, equally-spaced grooves 26 is formed to a lesser depth H2 of about 105 microns (FIG. 3). The spacing S1 provided between adjacent ones of the grooves 22 is about 0.018 inch, and the spacing S2 between adjacent ones of the grooves 24 is about 0.022 inch. As shown in FIGS. 2 and 3, the surface layer 22 attains an arcuate contour between adjacent ones of the grooves 24 and 26, respectively. Without desiring to be limited by any particular theoretical explanations, it is believed that these rounded contours in the front surface of the screen 10 tend to evenly distribute the light reflected therefrom in both the horizontal and vertical directions relative to the front of the screen.

It will be understood that the production of the screen 10 according to the present invention can be carried out by conventional laminating and embossing techniques, wherein the various layers of materials are fed from respective rolls and adhesively bonded to each other. In the event that thermosetting adhesives are used, as is presently preferred, the finished laminant is brought up to a temperature of about 350° F. to set the adhesives and to prepare the joined layers for embossing the sets of grooves 22 and 24 on the front viewing surface. This forming step can be carried out by an embossing head having the desired pattern engraved therein and maintained at a temperature of about 0° F., for example.

It has also been found that the screen 10 of the present invention can substantially suppress "moire" effects in the reflected image. These effects are well-known to occur with screens having closely spaced parallel lined grooves formed in their viewing surfaces, and are manifested as shimmering patterns across the screen depending upon the projected image and the position of the viewer. By permitting the thread count of the rear fabric layer 12 to coincide with the grooved patterns embossed in the viewing surface of the screen 10, these moire patterns can be substantially reduced. Accordingly, referring to FIGS. 2 and 3, the spaces S1 and S2 between adjacent ones of the grooves 24 and 26 should each coincide with single threads of the fabric layer 12, respectively.

For purposes of further explanation, and without intending to limit the scope of the present invention, the following two examples of a projection screen in accordance with the present invention are set out below in connection with FIGS. 1-4.

EXAMPLE 1

A projection screen which has a reflected brightness characteristic according to the solid curve 30 of FIG. 4 when maintained substantially flat and viewed at horizontal angles out to 70° from a head-on viewing position, is manufactured in accordance with the above description using layers having the following compositions and thicknesses:

| | |
|---|---|
| Fabric backing layer 12 | 50% Dacron polyester and 50% cotton (dyed black) |
| Filler layer 14 | 0.008 inches PVC |
| First metallic reflecting layer 16 | Aluminum, vacuum coated on rear side of film layer 18 to 0.5 ohms resistivity |
| Film layer 18 | 0.0005 inches "Melinex" matte finish polyester film (International Chemicals, Inc.) |
| Second metallic reflecting layer 20 | Aluminum, vacuum coated on front surface of film layer 18 to 1.0 ohms resistivity |
| Surface layer 22 | Polymer, deposited in thicknesses of 0.00015 inches to obtain a 15% light diffusion rate |
| Vertical grooves 24 | Embossed into viewing surface to a depth (H1) of 350 microns and spaced apart (S1) 0.018 inches |
| Horizontal grooves 26 | Embossed to a depth (H2) of 105 microns and spaced (S2) 0.022 inches |

As indicated by the curve 30 in FIG. 4, the projection screen of this example exhibits a useful horizontal viewing angle in excess of 70° from the head-on direction as determined in accordance with conventional goniophotometer measurement techniques, well known to those skilled in the art. Moreover, the reflected image brightness falls off relatively gradually from the head-on or zero degree viewing angle.

EXAMPLE 2

A projection screen which exhibits a reflected image brightness characteristic shown by the dotted curve 32 of FIG. 4 when mounted flat is manufactured in accordance with the materials and dimensions of EXAMPLE 1. In addition, a groove pattern substantially identical to the one formed in the front viewing surface is also embossed in the frontmost surface of the filler layer 14, prior to its being laminated against the coated film layer 18. Accordingly, the viewing surface pattern is embossed in registration with the same pattern appearing in the filler layer, during the manufacture of the screen according to the present invention.

As shown by the dotted curve 32 in FIG. 4, this additional embossing in the filler layer 14 provides a higher reflected image brightness than that obtained with the screen of EXAMPLE 1, up to angles of about 24°. Also, a luminance factor is excess of unity is obtained up to about 35° with the screen of EXAMPLE 2.

As will readily be apparent to those skilled in the art, the present invention may be realized in other specific forms without departing from its spirit or essential characteristics. For example, the backing layer 12 may include the equivalent supportive substrates in place of the fabric material herein disclosed. Also, the depths and spacings of the grooves 24, 26 embossed in the screen surface may be varied to obtain a desired brightness characteristic for the reflected image.

The present embodiment is, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. A front projection screen comprising a rear backing layer, a filler layer of flexible deformable material having its rear surface bonded to said backing layer, first and second metallic reflecting layers separated from each other by a light transmissive film layer, the first reflecting layer being maintained against the front surface of the filler layer, and a light-diffusing surface layer coated on the front surface of the second metallic reflecting layer to define a viewing surface, said viewing surface having a crosshatched pattern comprising a plurality of intersecting sets of parallel grooves formed therein so that images reflected from said screen can be viewed over a given range of viewing angles.

2. A projection screen according to claim 1, wherein said pattern comprises a first set of parallel, equally spaced grooves of a given depth aligned in said viewing surface in a vertical viewing direction, and a second set of parallel, equally spaced grooves of a lesser given depth aligned in said viewing surface in a horizontal viewing direction.

3. A projection screen according to claim 1, wherein said viewing surface attains a substantially arcuate contour between adjacent parallel grooves.

4. A projection screen according to claim 2, wherein said given depth of said first set of parallel grooves is about 350 microns and said lesser given depth of said second set of parallel grooves is about 150 microns.

5. A projection screen according to claim 1, wherein said rear backing layer comprises a woven fabric wherein single threads of said fabric are aligned between adjacent ones of said parallel grooves.

6. A projection screen according to claim 1, wherein said surface layer of light-diffusing material comprises a thermosetting polymer providing a diffusion rate of from about 5% to about 30%.

7. A projection screen according to claim 1, wherein said filler layer comprises a polyvinyl chloride film.

8. A projection screen according to claim 7, wherein said polyvinyl chloride film is of a thickness of about 0.008 inches.

9. A projection screen according to claim 1, wherein said separation layer comprises a polyester film.

10. A projection screen according to claim 9, wherein said polyester film has a thickness of from about 0.00025 inches to about 0.005 inches.

11. A projection screen according to claim 10, wherein said polyester film has a thickness of about 0.0005 inches.

12. A projection screen according to claim 1, wherein said first and second metallic reflecting layers are coated on respective surfaces of said separation layer.

13. A projection screen according to claim 12, wherein each of said first and second metallic reflecting layers comprises vacuum coated aluminum.

14. A projection screen according to claim 13, wherein the resistivity of said second metallic reflecting layer is from about 0.5 ohms to about 2.0 ohms.

15. A projection screen according to claim 14, wherein the resistivity of said first metallic reflecting layer is from about 0.25 ohms to about 1.0 ohms.

* * * * *